United States Patent [19]

Anderson et al.

[11] Patent Number: 5,389,931
[45] Date of Patent: Feb. 14, 1995

[54] RADAR SIGNAL PROCESSING SYSTEM

[75] Inventors: Eric E. Anderson, Palmdale; Ronald L. Bridegroom, Simi Valley; Pham G. Cuong, Moorpark; Charles M. Feld, Canoga Park; Knut S. Kongelbeck, Chatsworth; Terrance L. Simonson, Thousand Oaks, all of Calif.

[73] Assignee: Hughes Aircraft Company, Los Angeles, Calif.

[21] Appl. No.: 209,286

[22] Filed: Mar. 14, 1994

[51] Int. Cl.⁶ .............................................. G01S 13/60
[52] U.S. Cl. ...................................... 342/70; 342/192; 342/196; 342/194
[58] Field of Search ................ 342/195, 192, 194, 201, 342/202, 203, 204, 70, 71, 72, 158, 154, 196

[56] References Cited

U.S. PATENT DOCUMENTS

| | | | |
|---|---|---|---|
| 3,710,388 | 1/1973 | Banks | 342/158 |
| 3,713,155 | 1/1973 | Jaffe | 342/92 |
| 3,735,403 | 5/1973 | Sykes | 342/92 |
| 4,122,454 | 10/1978 | Frosch et al. | 342/425 |
| 4,200,871 | 4/1980 | Roeder et al. | 342/78 |
| 4,224,622 | 9/1980 | Scmidt | 342/78 |

*Primary Examiner*—John B. Sotomayor
*Attorney, Agent, or Firm*—Charles D. Brown; Randall M. Heald; Wanda K. Denson-Low

[57] ABSTRACT

A conical scan radar system (10) provides return pulses (30) to an A/D converter (38) from which a shaped pulse train is received and stored in a FIFO memory (40). The stored pulse train is then passed through first and second finite impulse response filters (42,44) for achieving sampling rate reduction prior to rendering via a programmable signal processor (64) of target detection identification and tracking.

3 Claims, 2 Drawing Sheets

RADAR SIGNAL PROCESSING SYSTEM

BACKGROUND OF THE INVENTION

1. Field of the Invention

The present invention relates generally to radar systems, and, more particularly, to a digital signal processing system for a ground-looking radar system.

2. Description of Related Art

A radar system, in its major elements, includes a radio frequency oscillator which is controlled by a pulse modulator, or pulser, so as to produce periodic high power electromagnetic energy pulses of relatively short duration. The pulses are applied to a highly directional antenna which transmits the pulses toward a target or towards a region in which a target is sought. A receiver, which may be interconnected with the same antenna as the transmitter, is controlled by a switching arrangement frequently referred to as a "duplexer" for interconnecting the antenna to the receiver during the interval between transmitted power pulses in order to receive reflected energy from a target. Monitoring antenna direction and timing of reflected pulse returns provides location and range of a target.

In what is referred to as a conical scan process, the radar beam is squinted and rotated about the antenna boresight. Targets located on boresight produce a constant signal return. For a target off boresight, the return signal is a modulated signal at the frequency of the beam rotation. The amplitude of the modulation indicates how far off boresight the target is, and return signal phase determines how far the target is off exact azimuth and elevation. In known systems, phase and quadrature reference signals are derived from the conical scan motor, and they are used to synchronously detect the return signal. The output of the two detection channels give the respective sine of the azimuth and elevation angles.

For a more detailed discussion of a conical scan radar system, reference can be made to *Introduction to Radar Systems*, by M. I. Skolnik, McGraw-Hill (1980), page 156.

There are other radar systems for detecting targets and their ranges which rely upon the radiation of unmodulated or continuous wave energy. The present invention, however, is not concerned with such continuous wave or "CW" radar systems, but rather with the aforedescribed pulse radar systems and, in particular, a conical scan radar system.

OBJECTS AND SUMMARY OF THE INVENTION

It is a primary aim and object of the present invention to provide a digital signal processing system for use with a conically scanned, non-coherent radar system employed to detect and guide to a ground target.

A further object is the provision of a signal processing system as in the preceding object having enhanced signal to noise ratio, relatively narrow range gates and a more robust angle measurement system than in known systems.

A still further object is the provision of a signal processing system as in the preceding objects of substantially increased implementation flexibility resulting from the use of a programmable signal processor.

The described radar system obtains synchronization signals from the antenna scan motor that indicates each octant of the antenna scan. Return signals are digitally integrated in each octant of the antenna scan, with the octant data added and subtracted to form sum channel data (i.e., adding all octants), and azimuth and elevation difference channel data. Ratio of the difference/sum provides the arc tangent of the target angle off boresight. Since the arc tangent value is digitally obtained, it may be readily modified to take into account the exact shape of the radar beam pattern.

As already noted, the system of the present invention is especially advantageous for utilization in a noncoherent pulsed radar using conical scan. Briefly as to system operation, N contiguous samples are taken within a given pulse frequency interval (PRI) with the spacing between samples determining the range gate sampling rate while a low-pass filter before the A/D converter establishes effective range gate width. Range sampling is in burst mode and a FIFO after the A/D converter spreads the range samples over the PRI reducing the sampling rate.

The information bandwidth within a range gate is determined by the absolute velocity with respect to ground of the fastest mover in the beam. On the other hand, the pulse repetition frequency (PRF) is the maximum possible that can still maintain unambiguous range operation. Accordingly, a given range gate is over-sampled and decimation filters are used to reduce the bandwidth of the sampled signal to twice the information bandwidth in order to enable sample rate reduction. The overall result of this is a lower computational speed requirement for the remainder of the digital signal processing.

In recapitulation of certain features of the invention, A/D conversion, PRI buffering and decimation filtering are all accomplished by dedicated hardware elements while the remainder of the processing is performed by a programmable signal processor the output of which is passed on to a conventional microcomputer data processor.

DESCRIPTION OF A PREFERRED EMBODIMENT

Figure 1:
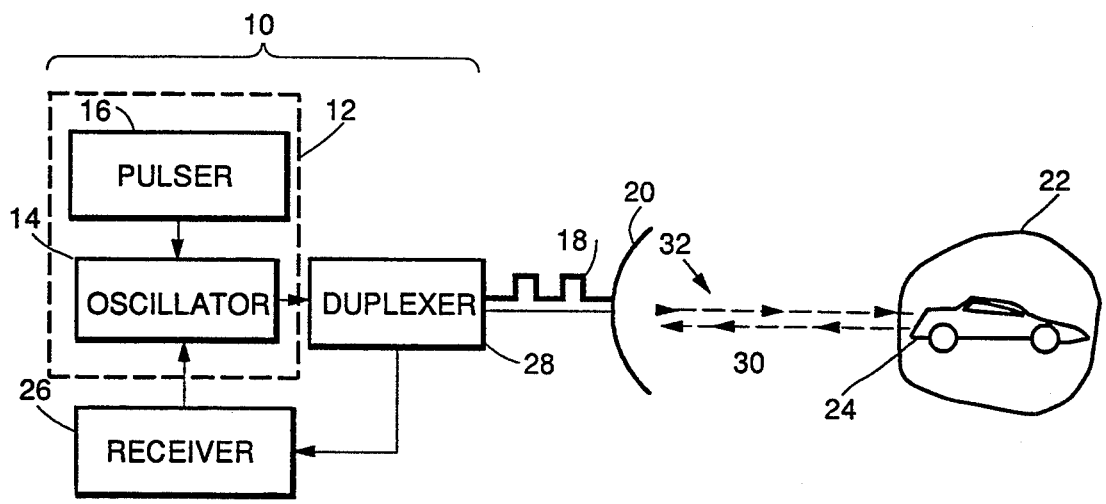
FIG. 1 is a schematic depiction of a pulse radar system.

With reference now to the drawing and particularly FIG. 1, a pulse radar system enumerated generally as 10 is seen to include a transmitter 12 consisting primarily of a high frequency oscillator 14 the output of which is modulated by a so-called pulser 16 to provide a series of high-power pulses 18. These pulses are transmitted to a directional antenna 20 which scans a target area 22. Pulses 18 impinge a target 24, and are reflected back to the antenna 20 and sent to a receiver 26. A duplexer 28 interconnects the receiver with the antenna 20 and simultaneously disconnects the transmitter during the interval between power pulse transmission, while the pulses are reflected from the target 24. The return pulses are enumerated as 30. A primary function accomplished by the receiver which is of special concern here is processing the reflected pulses 30 to determine precise direction and range of the target as measured from and along boresight 32.

Figure 2:
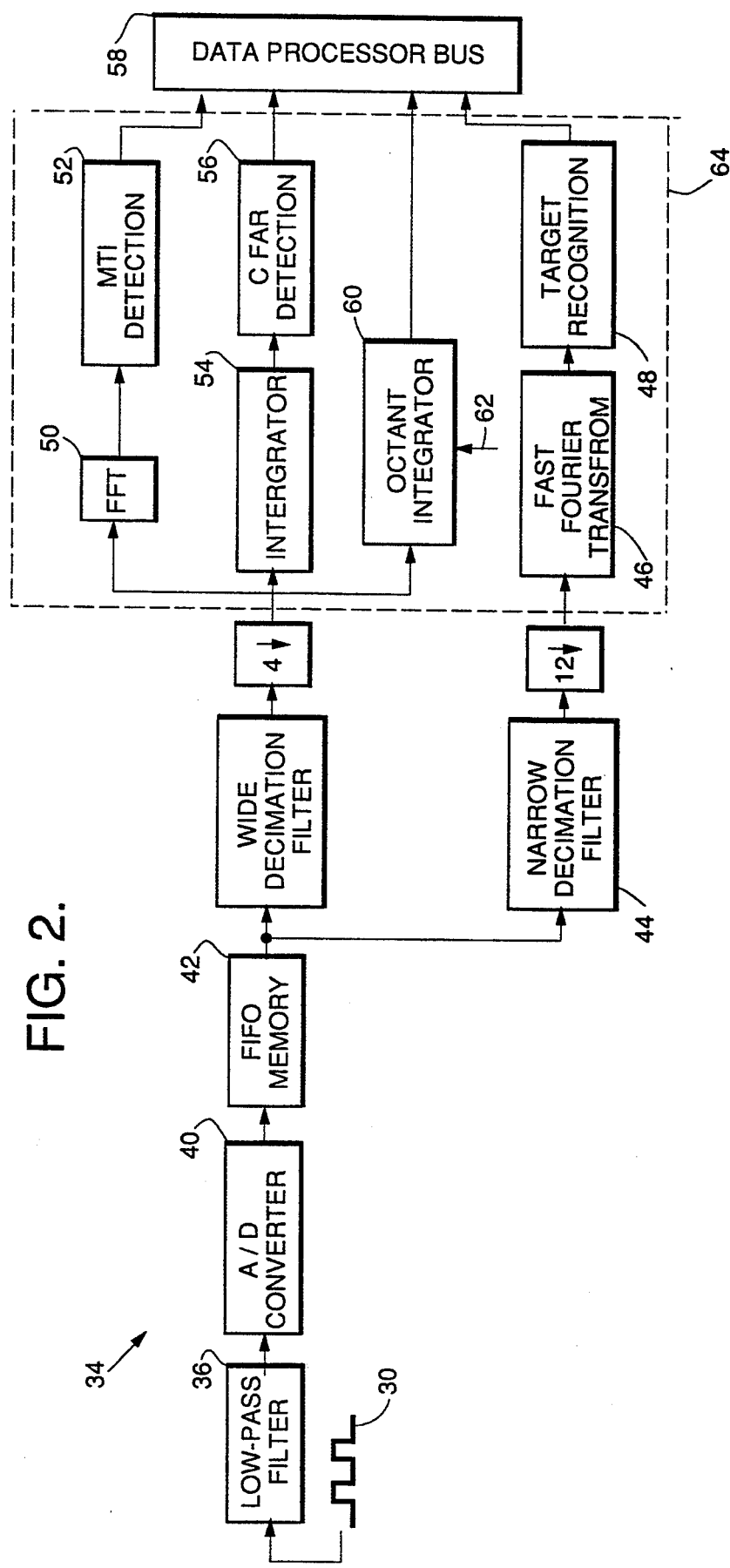
FIG. 2 is a function block diagram of the present invention shown in its broad features.

Turning now to FIG. 2, continuous samples of radar pulse signal returns 30 are received within a given pulse repetition interval (PRI) with the spacing between adjacent samples determining the range gate sampling rate. The processor 34 of this invention initially receives the pulses at a low-pass filter 36 where the effective range gate width is determined after which an analog to digital converter 38 provides a pulse train of predetermined frequency. Since range gates are only located at the radar beam intersection with the ground plane or with the target, range sampling occurs in what is typically termed burst mode.

A buffer memory 40 receives and stores the pulses from A/D converter 38 in such manner as to provide output in the same order in which the pulses were arranged during the input, hence, the further definition of the circuit as FIFO (i.e., first in first out). In the FIFO, range samples in digital form are also spread out somewhat over the pulse repetition interval in order to reduce the sample rate.

As is known, the information bandwidth within a given range gate is determined by the absolute velocity of the fastest mover in the beam (i.e. velocity with respect to the ground). Additionally, it is desirable that the pulse repetition frequency (PRF) be the maximum possible that still enables maintaining an unambiguous range operation. Accordingly, it is the operating philosophy of the described processor system to over-sample the signal derived from each range gate.

Output from FIFO memory 40 is fed to decimation filters 42 and 44 (also known as finite impulse response filters) which both filter out noise and lower the sample rate, and in that manner effectively reduce the bandwidth of the sample signal to approximately twice the information bandwidth. Also, by reducing the sample rate this results in lower computational speed requirements for the remainder of the digital signal processing.

More particularly, the decimation filter 44 is a low-pass filter which only looks at low-pass clutter and signal components, and the output of which is processed by a fast Fourier transform circuit 46 (FFT) to provide information from which target identification can be made based on vibrating and moving components on the target 24. Primarily, identification is performed by recognition of patterns existing in the FFT output, by that part of the equipment enumerated as 48 and further identified as target recognition.

The other decimation filter 42 provides a wider frequency span of filterings, the output of which then passes through a further FFT component 50 to a conventional circuit 52 for performing identification of moving targets (MTI). Also, the output of the wide decimation filter 42 after integration in integrator 54 accomplishes what is referred to as "constant false alarm rate" detection in a CFAR detection circuit 56. The outputs of MTI detection circuit 52, CFAR detection 56 and target recognition 48 are all fed into a data processor bus 58 for further processing.

All of the functions discussed to this point have been concerned with target detection and identification. For target tracking, the wide decimation filter 42 output is fed to an octant integrator 60 where range gate samples are summed within segments of the radar conical scan. The angle of arrival of a range sample is conventionally determined by addition and substraction of these various sums and in this way the angle of a given target off boresight 32 is determined. This information is also fed into the data processor bus 58.

Figure 3:
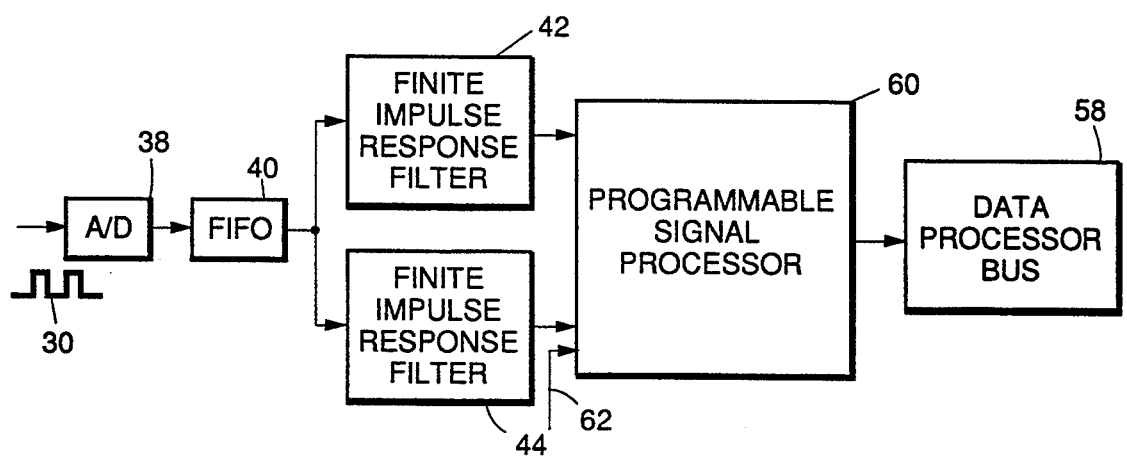
FIG. 3 is a further function block diagram showing operation of the signal processor in this invention.

Turning now to FIG. 3, the physical implementation of the signal processor of this invention is depicted in its major parts and relationship. More particularly, the A/D conversion, PRI buffering and decimation filtering are performed by dedicated logic components while the remainder of the processing is performed by a signal processor which is enumerated generally as 64. Synchronization signals 62 are obtained from the antenna scan motor (not shown) that identifies each octant of the antenna scan.

Decimation filters 42, 44 used in the described system have the beneficial effect of reducing system sample rate and, consequently, overall system complexity. It is well known that the minimum required sample rate for a signal is twice its bandwidth. If the bandwidth of a signal is reduced, this automatically reduces the necessary sample rate. The symbology in the drawing uses a downward arrow ($\downarrow$) for a reduction in the sampling rate, and the number "4", for example, indicates a sampling rate reduction to $\frac{1}{4}$ of what it had been.

Through the use of the two levels of decimation indicated (i.e., 4 and 12), the data rates have been reduced sufficiently to enable using available programmable signal processor technologies. Lacking this decimation, the programmable signal processor 64 described would be at least three times larger, which at the least would be cost prohibitive.

Moreover, if the data rates were to be in the prohibitively high ranges referred to (e.g., 3 times those required herein), this would almost certainly make it necessary to employ ECL or GaAs logic which have only about 1/10 the gate density of the more conventional and less expensive CMOS circuits.

Still further, the programmable signal processor provides a very flexible logical structure allowing a number of decision functions to be performed during signal processing which, in turn, implies that not all components of the data processing scheme need to be handled at the same time. For example, it is normally only necessary to perform MTI Doppler processing in those range gates in which an amplitude channel target has been detected. Without this flexibility of use, it would be necessary to provide discrete circuits to simultaneously process all range Doppler cells resulting in an undesirable increase of the signal processing load by a factor of about 10.

In a practical construction of the present invention, the functions of the programmable signal process 64 were provided by a commercially available VME circuit board manufactured by Impact Technologies, Inc., the designation "VME" referring to a well-known bus.

Although the present invention has been described in connection with a preferred embodiment, it is understood that one skilled in the appertaining arts may suggest modifications that come within the spirit of the invention as described and the scope of the appended claims.

What is claimed is:

1. A conical scan radar signal processing system for handling radar return pulse data and providing target detection, identification and tracking information comprising:

means for converting the return pulses into a pulse train of shaped pulses arranged in the same order as received;

a first finite impulse response filter connected to said means for providing a predetermined sample rate reduction output for use in moving target detection, constant false alarm rate detection and target tracking;

a second finite impulse response filter, interconnected with said means for converting, for providing an output of greater sample rate reduction than that of said first finite impulse response filter; and a programmable signal processor connected to receive the outputs of the first and second finite impulse response filters for achieving target detection, identification and tracking.

2. A conical scan radar signal processing system as in claim 1, in which the first and second finite impulse response filters are each a decimation filter.

3. A conical scan radar signal processing system as in claim 1, in which the first and second finite impulse response filters provide sample rate reductions of approximately 4 and 12, respectively.

* * * * *